(12) United States Patent
Lee et al.

(10) Patent No.: US 7,992,692 B2
(45) Date of Patent: *Aug. 9, 2011

(54) DAMPER EQUIPPED WITH RELATIVE DISPLACEMENT DETECTING SENSOR

(75) Inventors: Dong-Rak Lee, Busan (KR); Jae-Woo Park, Gyeongsangnam-do (KR); Min-Ho Chin, Gyeongsangnam-do (KR); Chang-do Huh, Busan (KR)

(73) Assignee: S & T Daewoo Co., Ltd., Busan (KR)

( * ) Notice: Subject to any disclaimer, the term of this patent is extended or adjusted under 35 U.S.C. 154(b) by 1053 days.

This patent is subject to a terminal disclaimer.

(21) Appl. No.: 11/780,708

(22) Filed: Jul. 20, 2007

(65) Prior Publication Data

US 2008/0264743 A1 Oct. 30, 2008

(30) Foreign Application Priority Data

Apr. 26, 2007 (KR) .................... 10-2007-0040776

(51) Int. Cl.
*F16F 9/12* (2006.01)
(52) U.S. Cl. .................... 188/266.1; 188/267
(58) Field of Classification Search .............. 188/267, 188/267.1, 267.2, 266.1–266.4, 322.17, 322.19
See application file for complete search history.

(56) References Cited

U.S. PATENT DOCUMENTS

| 5,996,745 A * | 12/1999 | Jones et al. ............... 188/266.7 |
| 7,259,553 B2 * | 8/2007 | Arns et al. ............... 324/207.25 |
| 7,493,995 B2 * | 2/2009 | Sas et al. ............... 188/267 |
| 7,628,253 B2 * | 12/2009 | Jin et al. ............... 188/266.1 |
| 2006/0011426 A1 * | 1/2006 | Sas et al. ............... 188/266.1 |
| 2008/0110710 A1 * | 5/2008 | Berberich ............... 188/266.2 |

FOREIGN PATENT DOCUMENTS

| EP | 296808 A1 * | 12/1988 |
| JP | 59-110708 | 7/1984 |
| JP | 04-071114 | 6/1992 |
| JP | H04-78505 | 7/1992 |
| JP | 09-329462 | 12/1997 |
| JP | 2006-273222 | 10/2006 |

* cited by examiner

*Primary Examiner* — Bradley T King
(74) *Attorney, Agent, or Firm* — Duane Morris LLP

(57) ABSTRACT

The present invention relates to a cylinder which has hollow portion therein; a piston rod which is inserted through an upper side of the cylinder and has a groove pattern having plurality of convex portions and concave portions which are alternately formed; a piston valve which is connected with a lower end of the piston rod so as to be reciprocated in the cylinder and has a fluid passing hole which is formed in an up and down direction; a rod guide which closes up an upper end of the cylinder tightly and guides an up-down movement of the piston rod and which has a through-hole at a side portion thereof; and a sensor module which is installed to the rod guide so as to detect a movement of the piston rod by using a variation in magnetic field generated when the piston rod is moved.

12 Claims, 8 Drawing Sheets

DAMPER EQUIPPED WITH RELATIVE DISPLACEMENT DETECTING SENSOR

This application claims the benefit of Korean Patent Application No. 2007-40776, filed on Apr. 26, 2007, in Korea, which is hereby incorporated by reference for all purposes as if fully set forth herein.

BACKGROUND OF THE INVENTION

1. Field of the Invention

The present invention relates to a damper equipped with a relative displacement detecting sensor and more particularly, to a damper equipped with a sensor for detecting a movement of a piston rod.

2. Discussion of the Related Art

Generally, a suspension system is disposed between a wheel and a chassis to improve a ride feeling of a vehicle. The suspension system includes a chassis spring for absorbing vibration and shock from a road surface and a damper for damping free vibration of the chassis spring and thereby improving the ride feeling.

The damper functions to convert energy of up and down motion into heat energy, thereby absorbing and thus rapidly damping the free vibration of the chassis spring.

Recently, in a high-class motorcar, there is widely used an active controlled suspension system which detects a body status of the ear and then feeds back the detecting results so as to electronically control a damping force of the damper.

As one out of various methods of electronically controlling the damping force of the damper, there is generally used a method in which a fluid passing hole is formed in a piston valve reciprocating in a cylinder and the movement of fluid through the fluid passing hole is adjusted.

The method of adjusting the movement of fluid through the fluid passing hole is classified into a way of adjusting a sectional area of the fluid passing hole using a spring and a way that fills electro-rheological fluid or magnetic-rheological fluid in the cylinder and then adjusts a flowing resistance of the fluid using an electronic or magnetic property of the fluid.

Meanwhile, in order to electronically control the damping force of the damper, first of all it is important to exactly detect the body status of the car. Thus, a sensor for detecting the body of car is needed.

In a conventional active controlled suspension system, to determine the body status of the car, a link type sensor is provided independently of the damper between a chassis and a wheel axle (or the wheel) to defect a degree of vibration or shock from a road surface. Then, by using the detected result, an operation of the damper is controlled indirectly.

However, in order to dispose the link sensor, of which one end is coupled to the chassis and the other is coupled to the wheel axle (or the wheel), at a lower side of the chassis, a considerable space is required and this becomes a burden on a design of car.

Therefore, to solve the problem, there is a growing need for a small-sized sensor which can directly detect the operation of the damper. However, it has still failed to provide a sensor having enough stability and durability to be used for a long time in the car which is always exposed to vibration and shock.

For example, since a contact type sensor (e.g., potential meter) which is used for controlling an actuator is attached to a piston rod or a piston valve to detect a moving status thereof, there is a problem that the sensor may often be damaged by friction and thus a life span thereof is reduced.

In addition, an optical sensor is weak in shock and also, if light is excluded by foreign substances, the optical sensor can be used no longer.

SUMMARY OF THE INVENTION

Accordingly, the present invention is directed to a damper equipped with a relative displacement detecting sensor that substantially obviate one or more of problems due to limitations and disadvantages of the related art.

It is an object of the present invention to provide a damper in which a sensor module having good durability is directly installed so as to exactly detect the movement of the damper, thereby precisely controlling the damping force on the basis of the detected result.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides a damper comprising a cylinder which has a hollow portion therein; a piston rod which is inserted through an upper side of the cylinder and has a groove pattern having plurality of convex portions and concave portions which arc alternately formed; a piston valve which is connected with a lower end of the piston rod so as to be reciprocated in the cylinder and has a fluid passing hole which is formed in an up and down direction; a rod guide which closes up an upper end of the cylinder tightly and guides an up-down movement of the piston rod and which has a through-hole at a side portion thereof; and a sensor module which is installed to the rod guide so as to detect a movement of the piston rod by using a variation in magnetic field generated when the piston rod is moved.

In addition, the groove pattern of the piston rod is formed in a direction perpendicular to a moving direction of the piston rod. A plating layer formed of a non magnetic material is formed on a surface of the piston rod so as to cover the groove pattern. Further, a magnetic-rheological fluid is filled in the cylinder, and a solenoid coil is provided in the piston valve to control a movement of the fluid which is passed through the fluid passing hole. And the rod guide is formed with a through-hole at a side portion thereof to install the sensor module.

Meanwhile, the sensor module comprises a magnet for generating a magnetic field; a GMR sensor which is placed between the magnet and the piston rod so as to detect a variation in the magnetic field and then output an electric signal; a signal processing part for processing the output signal from the GMR sensor and outputting a square wave; and a housing for supporting the magnet, the GMR senor and the signal processing part.

The GMR sensor has a structure in which a serially connected pair of a first resistor device and a second resistor device and a serially connected pair of a third resistor device and a forth resistor device are parallelly connected, and the electric signal is an output voltage generated according to a variation in a magnetic field between a first node between the first resistor device and the second resistor device and a second node between the third resistor device and the forth resistor device.

The GMR sensor has a first sub sensor 130a and a second sub sensor for detecting a variation of magnetic field and outputting an electric signal, respectively, and a front end of the first sub sensor and a front end of the second sub sensor are spaced in a predetermined distance in a moving direction of the piston rod, and thus an output signal of the first sub sensor and an output signal of the second sub sensor are generated with a time difference when the object moves.

The signal processing part comprises a signal amplifying part for amplifying the output signal of the GMR sensor; and a digital transformation part for transforming the signal amplified in the signal amplifying part to a square wave to send to an outside.

The housing is provided with an opening at an end thereof and the GMR sensor is mounted on an outside of a PCB substrate which closes up the opening. And a protective cover is provided at an outside of the GMR sensor. The magnet is a permanent magnet which is fixed to an inside of the PCB substrate.

A second PCB substrate mounted with the signal processing part and attached circuits is installed inside the housing and the PCB substrate and the second PCB substrate are electrically connected through FPCB.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiment of the present invention, which is illustrated in the accompanying drawings.

Figure 1:
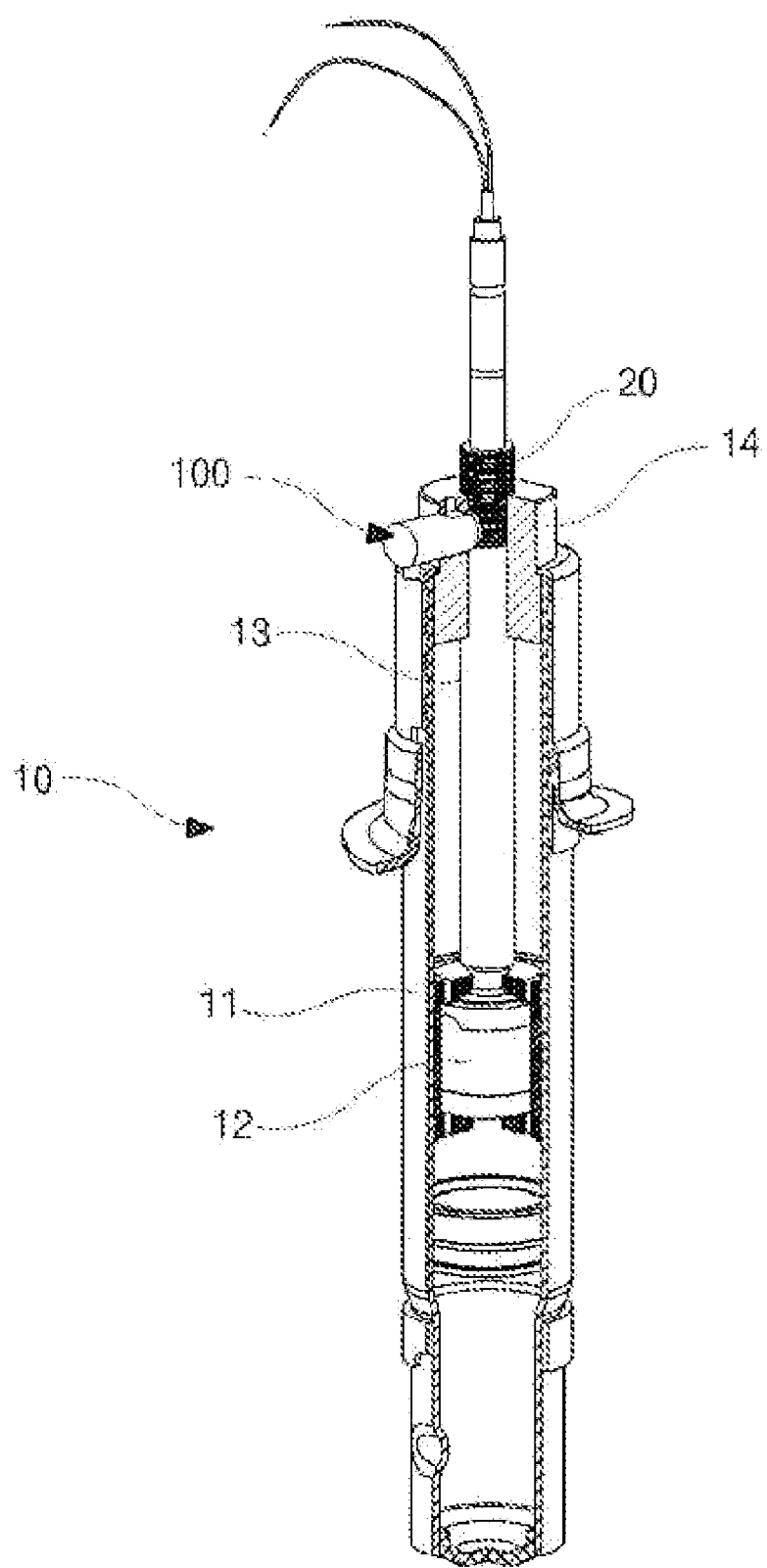
FIG. 1 is a perspective view, partially cut-away, of a damper in which a sensor module is installed according to an embodiment of the present invention.

FIG. 1 is a perspective view, partially cut-away, of a damper 10 according to an embodiment of the present invention, particularly, a damper which controls a damping force using a magnetic-rheological fluid.

The damper includes a cylinder 11 which has a hollow portion therein, a piston rod 13 which is inserted through an upper side of the cylinder 11, a piston valve 12 which is connected with a lower end of the piston rod 13 so as to be reciprocated in the cylinder 11 and a rod guide 14 which is fitted in an upper end of the cylinder 11 so as to close up the cylinder 11 tightly and also to guide an up-down movement of the piston rod 13.

Figure 2:
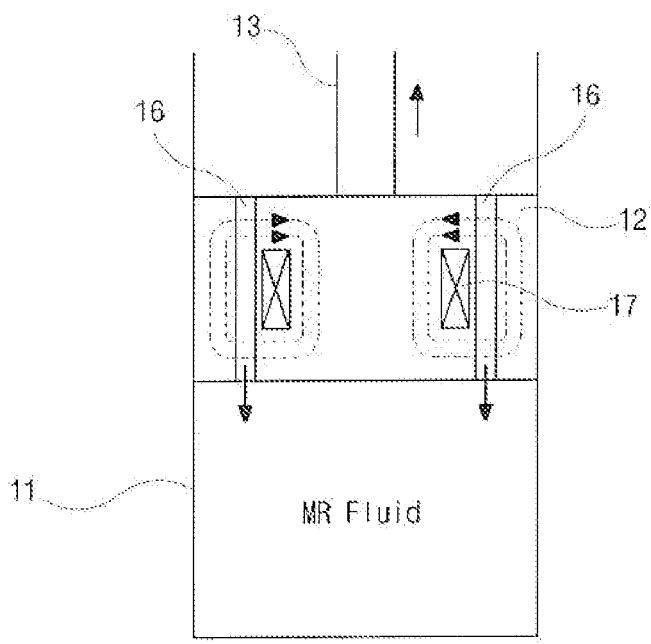
FIG. 2 is a view showing the principle on which an MR damper operates.

Especially, in the damper 10 using the magnetic-rheological fluid as shown in FIG. 2, the magnetic-rheological fluid is filled in the damper 10 and also there is provided a solenoid coil 17 for controlling a fluid passing hole 16 formed in the piston valve 12 and a movement of the fluid which is passed through the fluid passing hole 16.

The magnetic-rheological fluid contains metallic particles which can be magnetized. If a magnetic field is generated on the periphery of the magnetic-rheological fluid, an apparent viscosity thereof is changed. Therefore, a flowing resistance of the fluid can be adjusted by controlling an electric current applied to the solenoid coil 17 and thus controlling the magnetic field on the periphery of the fluid passing hole 16. As the result, the damping force or tensile force of the damper can be controlled.

The electric current applied to the solenoid coil 17 is controlled on the basis of a body status of car detected through a sensor by an ECU (Electronic Control Unit). To this end, in an embodiment of the present invention, a sensor module 100 which can detect the movement of the piston rod 13 in a non-contact manner is disposed at a side portion of the rod guide 14.

Figure 3:
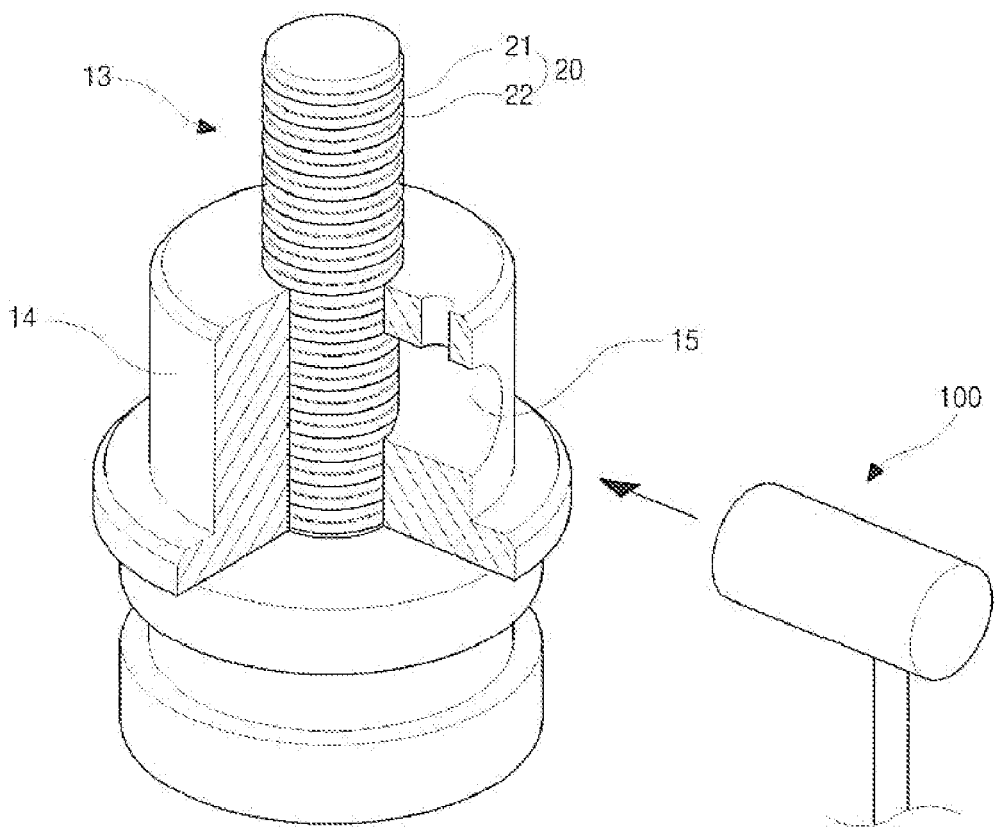
FIG. 3 is a perspective view, partially cut-away, of a rod guide to which the sensor module is coupled.

FIG. 3 shows a status that the sensor module 100 is inserted into a though-hole 15 formed at the side portion of the rod guide 14.

The sensor module 100 may be inserted through a side wall of the cylinder 11. However, it is preferable that the Sensor module 100 is installed in the rod guide 14 so as to be placed as close as possible to the piston rod 13 and also to prevent the fluid in the cylinder from being leaked.

It is also possible to fix the sensor module 100 on an upper side of the rod guide 14 without forming the through-hole at the side portion of the rod guide 14. In this case, a separate fixing means is needed for fixing the sensor module 100 on the rod guide 14.

Meanwhile, on an area of the piston rod 13, which is detected by the sensor module 100, there is formed a groove pattern 20 in which a convex portion 21 and a concave portion 22 are formed alternately. A pitch and shape of the convex portion 21 and the concave portion 22 may be selected properly according to a detection resolution.

The reason for forming the groove pattern 20 as described above is caused by that the sensor module 100 used in the embodiment of the present invention is a non-contact type sensor using a variation in the magnetic field. This will be described later.

Preferably, the groove pattern 20 of the piston rod 13 is formed in a direction perpendicular to a moving direction (up and down direction in the drawing) of the piston rod 13, and the convex portion 21 and the concave portion 22 have a uniform size and pitch.

However, although the groove pattern 20 is not formed to be perpendicular to the moving direction of the piston rod 13, but formed to he slightly inclined, it is possible to exactly perform the detecting operation.

Hereinafter, the sensor module 100 used in the embodiment of the present invention will be described in detail.

Figure 4A:
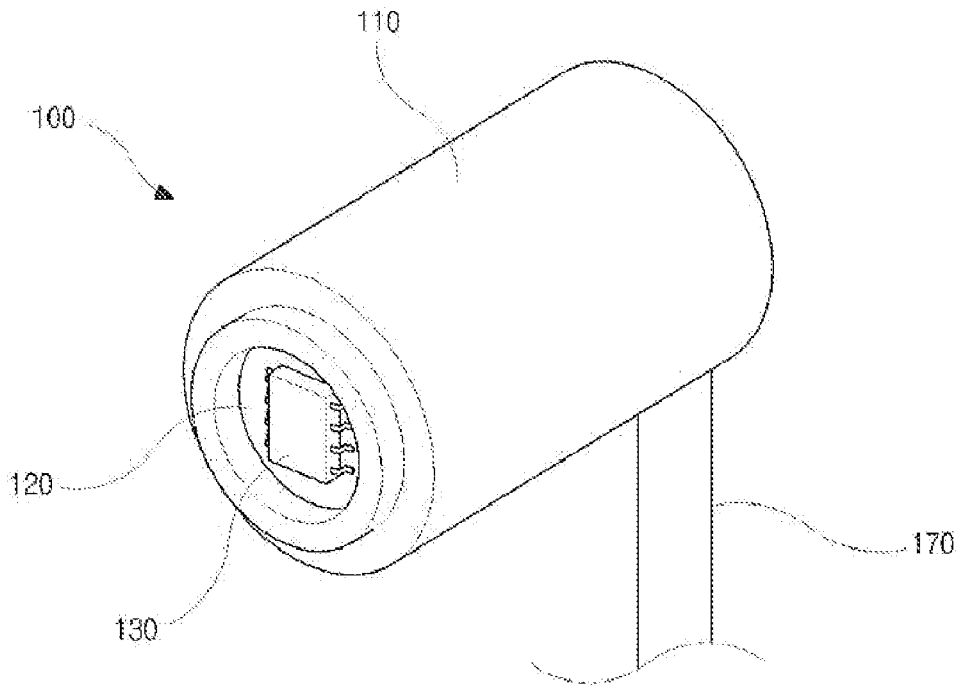
FIGS. 4A and 4B are respective a perspective view and a perspective view, partially cut-away, of the sensor module which is used in the embodiment of the present invention.
Figure 4B:
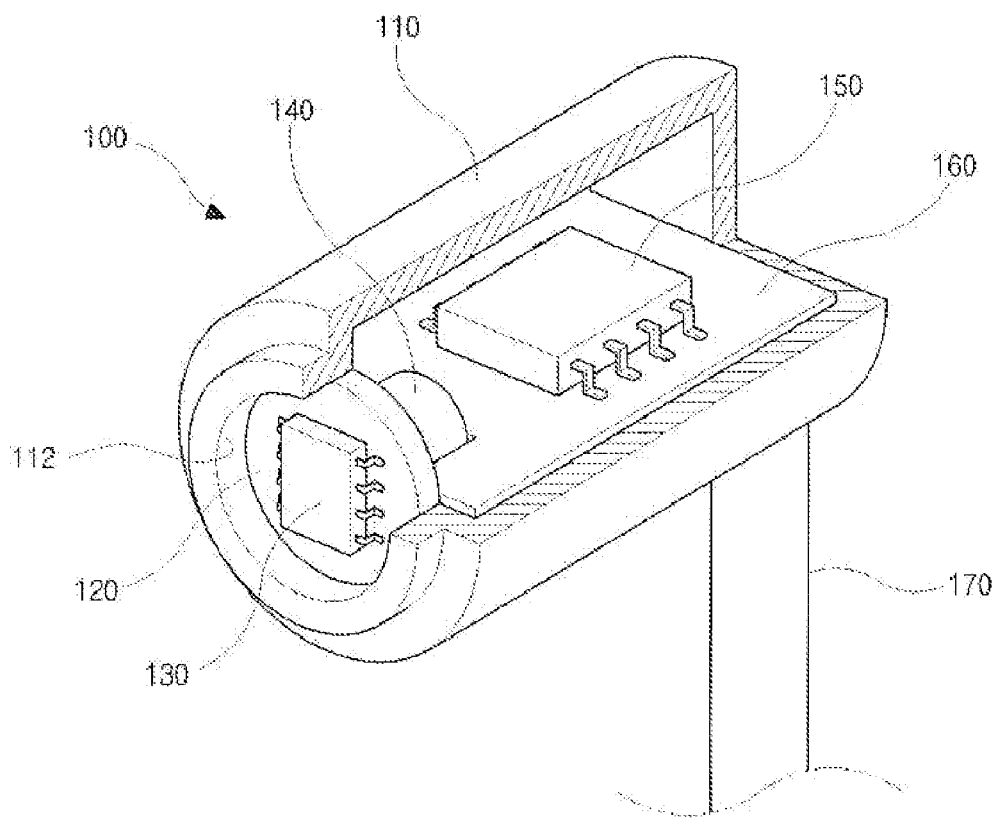

As shown in FIGS. 4A and 4B, the sensor module 100 includes a hosing 110 which has a hollow portion therein and an opening 112 at one end thereof, a first PCB 120 which closes up tightly the opening 112 in the housing 110, a GMR sensor 130 which is coupled to an outside of the first PCB 120, and a permanent magnet 140 which is coupled to an inside of the first PCB 120.

Further, a signal processing part 150 for processing an output signal of the GMR sensor 130 is installed in the housing 110, and the signal processing part 150 or other parts are mounted on a second PCB 160.

A power/signal line 170 is extended to the outside of the housing 110, and the power/signal line 170 includes a power supplying line for supplying power which is necessary for operating the GMR sensor 130 and the signal processing part 150, and a signal transferring line for transferring an output signal from the signal processing part 150 to the outside.

The shape of the housing 110 may be changed according to an installation place. Thus, it is not limited to the cylindrical shape as shown in drawings.

The GMR sensor 130 has a property that a resistance value of a resistor device disposed therein is changed according to an intensity of peripheral magnetic, and thus an output voltage is changed according to a variation in the circumferential magnetic field even under the same input voltage.

Accordingly, such the GMR sensor has been used in a field related to recording and reproducing of a Hard Disk Drive (HDD) because the intensity of the magnetic field can be measured by using the output voltage of the GMR sensor 130.

The embodiment of the present invention suggests the sensor module 100 for detecting a relative displacement of a cylindrical actuator in non-contact manner using such the GMR sensor 130.

The GMR sensor 130 is exposed out of the housing 110 through the opening 112 of the housing 110 in the state of being mounted on the first PCB, however a protective cover (not shown) may be further provided at an outside of the GMR sensor 130 to protect the GMR sensor 130 from contaminants.

The second PCB 160 mounted with the signal processing part 150 for processing the output signal from the GMR sensor 130 should be electrically connected with the first PCB 120 on which the GMR sensor 130 is mounted. For this end, the first PCB 120 and the second PCB 160 can be connected using FPCB and the like. Of course, other electrical connection means may be used.

Figure 5:
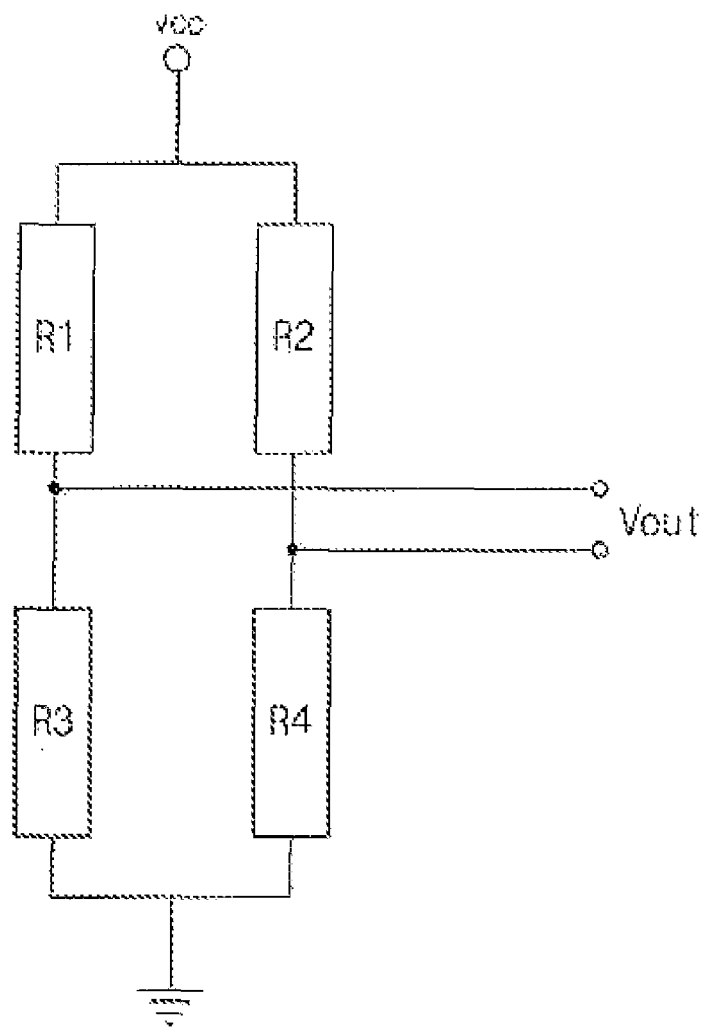
FIG. 5 is a schematic view of a GMR sensor.

The GMR sensor 130 may be fabricated in a variety of shapes and one example thereof is shown in a block diagram of FIG. 5. In other words, four resistor devices R1, R2, R3 and R4 are connected in the form of Wheatstone bridge to construct the GMR sensor 130 and, at this time, the resistor devices R1, R2, R3 and R4 are thin metal films which are vapor-deposited on a substrate and at least one of the resistor devices R1, R2, R3 and R4 has a property that its resistance value varies according to an intensity of peripheral magnetic field.

Therefore, if the magnetic field varies at the circumference of the GMR sensor, a resistant balance of the Wheatstone bridge is broken and a predetermined output voltage Vout is generated in the GMR sensor 130.

Figure 6:
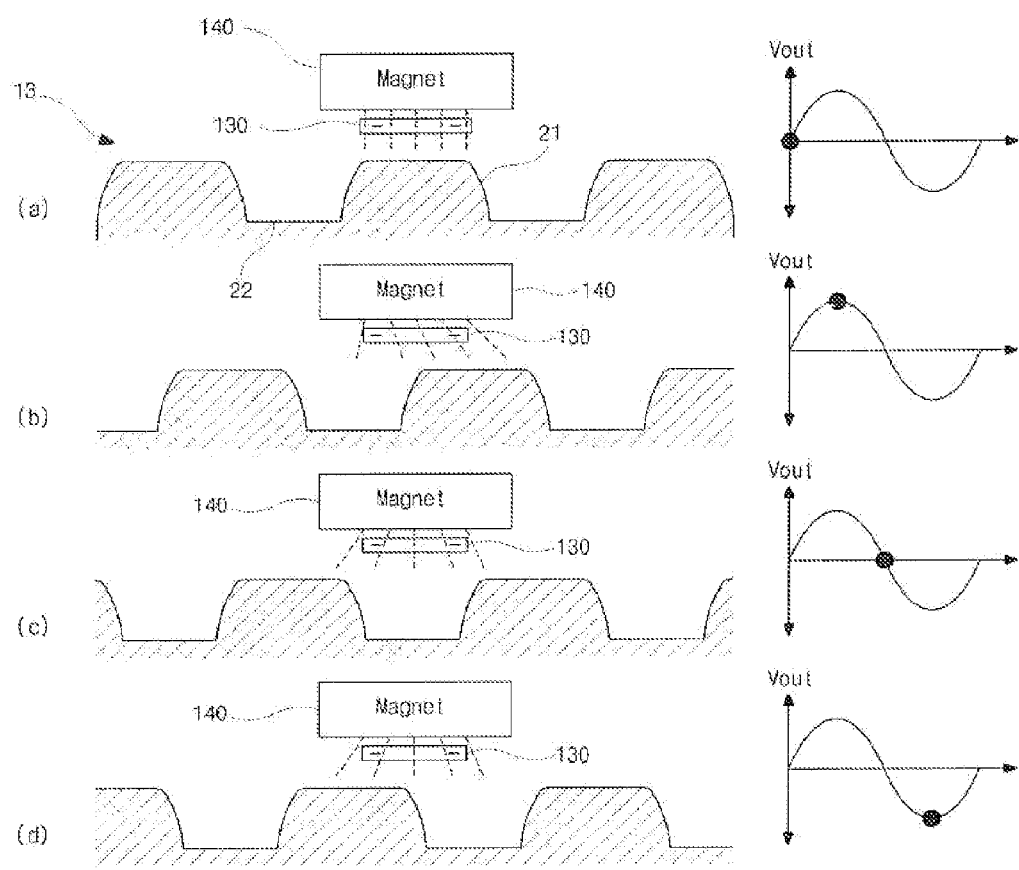
FIG. 6 is a view showing the principle that the GMR sensor detects a movement of a target object.

FIG. 6 is a view illustrating variation in the output voltage Vout of the GMR sensor 130 with a movement of the piston rod 13.

If the piston rod 13 is moved in the state that the permanent magnet 140 is installed to be adjacent to the piston rod 13 having the groove pattern, a distance between the permanent magnet 140 and the piston rod 13 is varied periodically because of the convex portion 21 and the concave portion 22 of the groove pattern, whereby a pattern of the magnetic field between the permanent magnet 140 and the piston rod 13 is periodically varied.

Therefore, if the GMR sensor is installed between the permanent magnet 140 and the piston rod 13, a resistance value of the resistor device which is built in the GMR sensor 130 is changed due to the variation in the magnetic field and thus the output voltage Vout is periodically changed.

Firstly, assume that in the ease that the GMR sensor 130 has the resistor devices R1, R2, R3 and R4 connected as shown in FIG. 5 and the GMR sensor 130 is placed at an upper portion of the convex portion 21 of the piston rod as shown in FIG. 6A, resistance values of the resistor devices R1, R2, R3 and R4 are balanced and thus the output voltage Vout is 0.

Subsequently, when the permanent magnet 140 is started to overlap with an upper portion of the concave portion 22 while the piston rod 13 moves to the right side of the drawing as shown in FIG. 6B, the resistant balance of the GMR sensor 130 is broken due to the variation in the magnetic field and an output voltage Vout is started to be generated.

The output voltage Vout is gradually increased and then decreased again as the GMR sensor 130 is much overlapped with the upper portion of the concave portion 22, and the Vout becomes zero as the resistant balance is made again when the permanent magnet is completely positioned on the upper portion of the concave portion 22 as shown in FIG. 6C.

When the piston rod 13 moves continuously to the right side of the drawing and the permanent magnet 140 is started to overlap again with the upper portion of the convex portion 21 as shown in FIG. 6D, the resistant balance of the GMR sensor 130 is broken again and the output voltage Vout is started to be generated and, in this case, the output voltage Vout has an opposite polarity to FIG. 6A.

Consequently, while the piston rod 13 having the groove pattern of the convex portion 21 and the concave portion 22 moves with respect to the permanent magnet 140, the GMR sensor 130 generates continuously the output voltage Vout of a sine wave form.

Figure 7:
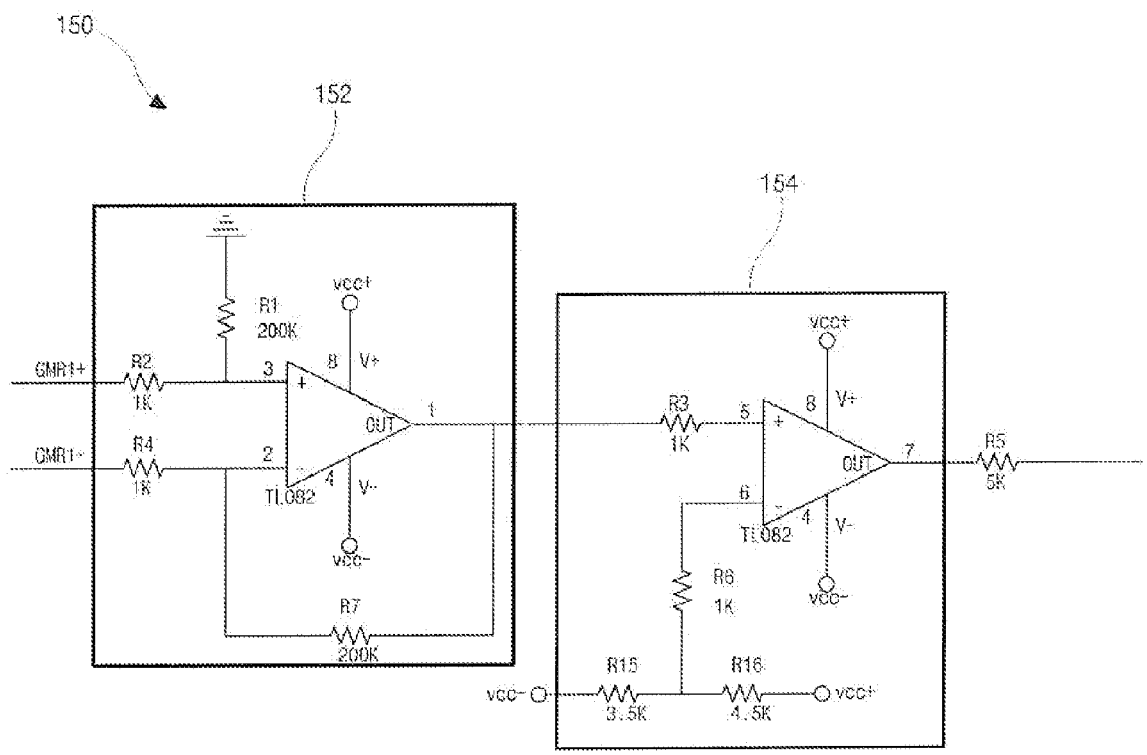
FIG. 7 is a block circuit diagram of a signal processing part.

The signal processing part 150 includes a signal amplifying part 152 and a digital transformation part 154 as shown in a circuit block diagram of FIG. 7.

The signal amplifying part 152 serves to amplify the output voltage Vout of the GMR sensor 130 and, for example, the output voltage Vout which is amplified to R7/R4, i.e. 200 times can be obtained in the circuit of FIG. 7.

The digital transformation part 154 serves to transform the signal amplified in the signal amplifying part 152 to a square wave.

A frequency, a pulse width, offset data and the like output from the digital transformation part 154 is transmitted to a control module (not shown) for controlling an operation of the actuator, and the control module determines a moving speed or moving distance of the piston rod 13 using such the data, sends a necessary control signal and thus feedback-controls the operation of the actuator.

Meanwhile, if using the GMR sensor 130 described above, there is a problem that it is possible to detect the movement of the object whereas it is impossible to determine a moving direction.

In other words, in the ease that the output voltage Vout of the GMR sensor 130 goes from the maximum value as shown in FIG. 6IB to zero, it is difficult to determine whether the GMR sensor 130 is placed at the position of FIG. 6A or at the position of FIG. 6C.

To solve this, an embodiment of the present invention detects the moving direction of the piston rod 13 using the GMR sensor 130 having two sensors in one semiconductor chip. In other words, the GMR sensor 130 is comprised of a first sub sensor 130a and a second sub sensor, which has four resistor devices constructing the Wheatstone bridge, respectively, as shown in FIG. 8.

At this time, if the first and the second sub sensors 130a and 130b are not formed in the same position but formed so that a front end of the first sub sensor 130a and a front end of the second sub sensor 130b are spaced in a predetermined distance in a moving direction of the piston rod 13, since points of time, at which the output voltages Vout are generated from the first sub sensor 130a and the second sub sensor 130b, become different, the moving direction of the object can be determined using this.

Figure 8:
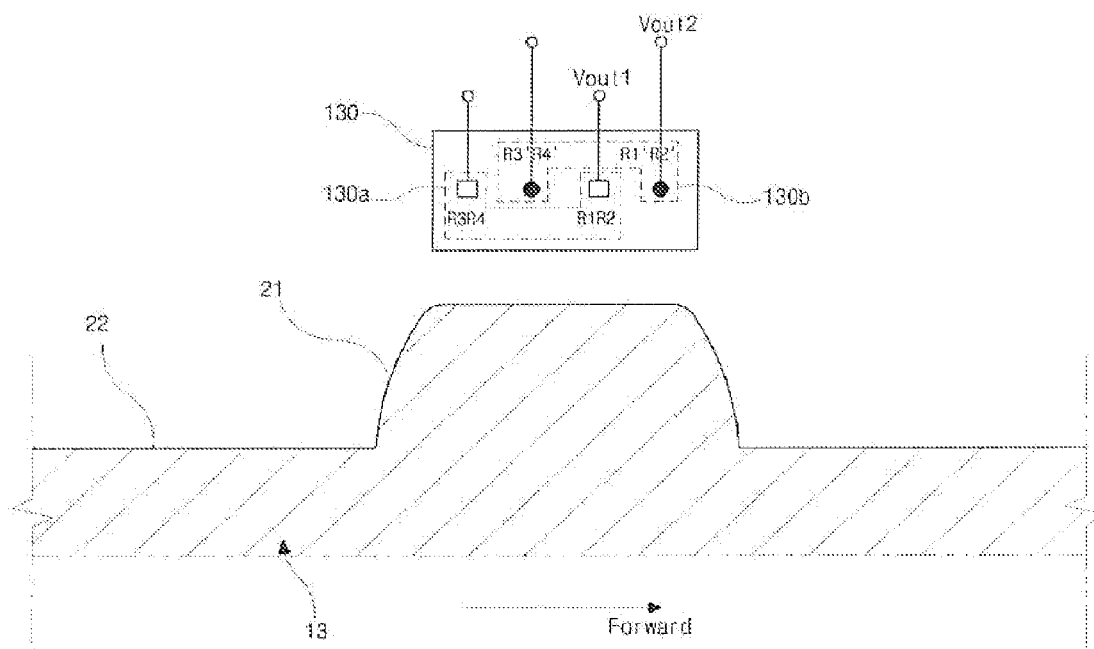
FIG. 8 is a view showing a status that the GMR sensor having two sub-sensors detects the target object.

In other words, if the piston rod 13 moves to the right side of the drawing in FIG. 8, the first sub sensor 130a is located at the upper portion of the concave portion 22 prior to the second sub sensor 130b while the concave portion 22 approaches to a lower portion of the GMR sensor 130.

Therefore, the output voltage is firstly generated from the first sub sensor 130a due to the variation in the magnetic field and then the output voltage is generated from the second sub sensor 130b after predetermined time has elapsed.

Figure 9A:
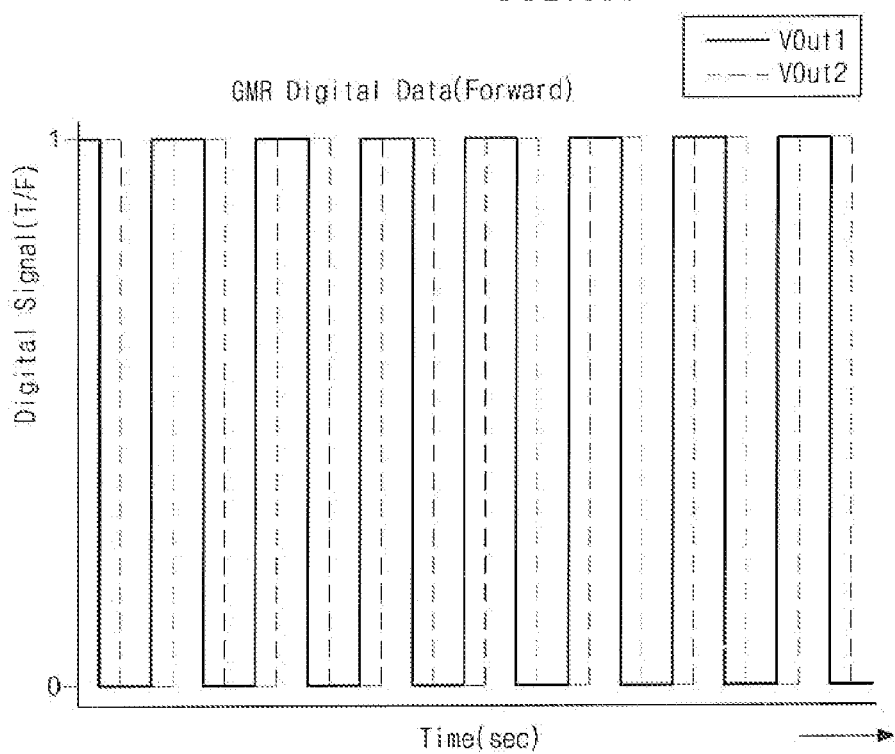
FIGS. 9A and 9B are views showing a status each output signal of the two sub-sensors has a time difference according to a moving direction of the target object.

In this case, the output signal of the signal processing part 150 is expressed as shown in FIG. 9A and thus it would be appreciated that the output signal Vout1 of the first sub sensor 130a precedes in time the output signal Vout2 of the second sub sensor 130b.

If the piston rod 13 moves to the left side of the drawing, the output voltage is firstly generated from the second sub sensor 130b and the output voltage is generated from the first sub sensor 130a alter predetermined time has elapsed.

Figure 9B:
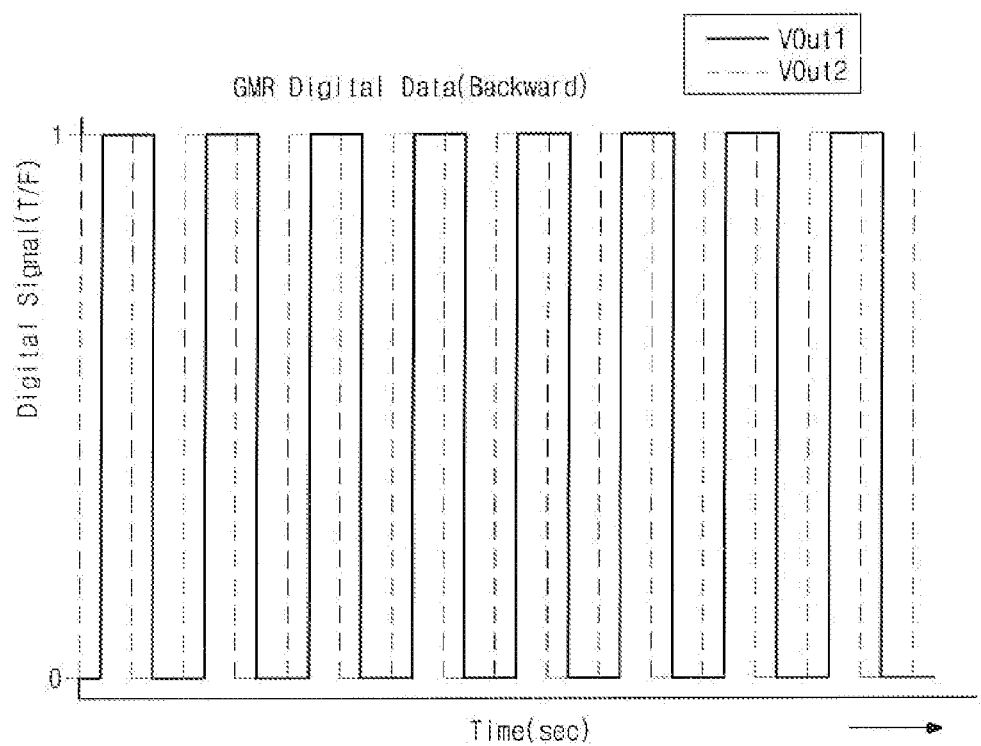

In this case, observing the output signals of the signal processing part 150, the output signal Vout2 from the second sub sensor 130b precedes in time the output signal Vout1 from the first sub sensor 130a as shown in FIG. 9B.

Consequently, the moving direction of the piston rod 13 can be determined by using a generation sequence of the output signal of the first sub sensor 130a and the output signal of the second sub sensor 130b.

Figure 10:
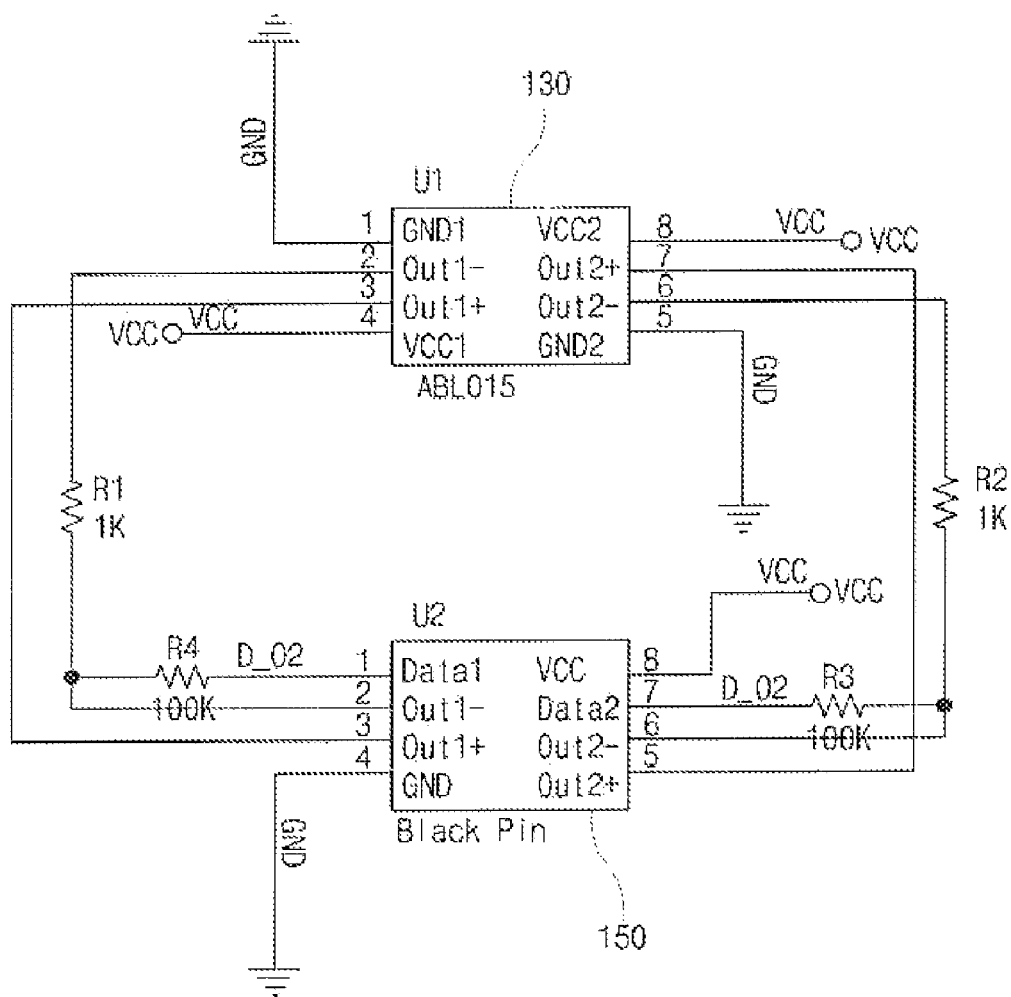
FIG. 10 is a block circuit diagram showing a connecting construction of the GMR sensor having the two sub-sensors and the signal processing part.

FIG. 10 is a circuit block diagram illustrating a connection between the GMR sensor 130 having the two sub sensors and the signal processing part 150.

In the GMR sensor 130, each sub sensor is provided with an independent output terminal Vout1, Vout2. And the signal processing part 150 processes independently the signal from each of the output terminals Vout1 and Vout2 of the GMR sensor 130 and then outputs in square waves.

The sensor module 110 can adjust a resolution by controlling the pitches of the convex portion 21 and the concave portion 22 of the piston rod 13, and also can be fabricated in a small size having a diameter of 12 mm arid a length of 25 mm when the sensor module 110 is installed to the damper 10 in a vehicle.

In addition, since the movement of the piston rod 13 can be detected in theory even in the case that the pitch between the convex portion 21 and concave potion 22 is 10 μm, it is possible to precisely control the damping force of the damper 10.

Meanwhile, since the piston rod 13 is made of iron, it is preferable that a plating layer is formed on a surface thereof. At this time, the plating layer is firstly formed to have an enough thickness to fill up the concave portion 22 of the groove pattern 20 and then the piston rod 13 is treated to have a smooth surface by a grinding process.

However, although the piston rod 13 is formed with the plating layer, of course, the sensor module 100 can detect the convex portion 21 and the concave portion 22 place at a lower side of the plating layer.

Therefore, it is preferable that the plating layer is formed of a non-magnetic material like chrome (Cr) which does not exert an influence on the magnetic field generated from the sensor module 100.

Thus far, the embodiment of the present invention takes the damper 10 using the magnetic-rheological fluid as an example. It is natural that the sensor module 100 can be directly applied to other kinds of electronically controlled dampers to feedback the detecting result and thus to control the damping force.

In addition, although the damper described in the embodiment of the present invention is described to be used in the car, but the embodiment is not limited to the damper for the car. It may be also applied to a landing gear of a flight vehicle. In addition, it may be used to detect an operation of an actuator of an industrial equipment or a construction equipment such as an excavator, or used in a usage for detecting an operation of an actuator of an equipment for factory automation.

According to the present invention, since the sensor can be directly installed to the damper to detect the movement of the damper, it is possible to precisely control the damping force of the damper on the basis of the detected result.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A damper comprising:
a cylinder which has a hollow portion therein;
a piston rod which is inserted through an upper side of the cylinder and has a groove pattern having a plurality of convex portions and concave portions which are alternately formed;
a piston valve which is connected with a lower end of the piston rod so as to be reciprocated in the cylinder and has a fluid passing hole which is formed in an up and down direction;
a rod guide which closes up an upper end of the cylinder and guides an up-down movement of the piston rod and which has a through-hole at a side portion thereof; and
a sensor module which is installed to the rod guide so as to detect a movement of the piston rod by using a variation in magnetic field generated when the piston rod is moved,
wherein the sensor module comprises:
a magnet for generating a magnetic field;
a GMR sensor which is placed between the magnet and the piston rod so as to detect a variation in the magnetic field and then output an electric signal;
a signal processing part for processing the output signal from the GMR sensor and outputting a square wave; and
a housing for supporting the magnet, the GMR sensor and the signal processing part.

2. The damper according to claim 1, wherein the groove pattern of the piston rod is formed in a direction perpendicular to a moving direction of the piston rod.

3. The damper according to claim 1, wherein a plating layer formed of a nonmagnetic material is formed on a surface of the piston rod so as to cover the groove pattern.

4. The damper according to claim 1, wherein a magnetic-rheological fluid is filled in the cylinder, and a solenoid coil is provided in the piston valve to control a movement of the fluid which is passed through the fluid passing hole.

5. The damper according to claim 1, wherein the rod guide is formed with a through-hole at a side portion thereof to install the sensor module.

6. The damper according to claim 1, wherein the GMR sensor has a structure in which a serially connected pair of a first resistor device and second resistor device and a serially connected pair of a third resistor device and a fourth resistor device are parallelly connected, and the electric signal is an output voltage generated according to a variation in a magnetic field between a first node between the first resistor device and the second resistor device and a second node between the third resistor device and the fourth resistor device.

7. The damper according to claim 1, wherein the GMR sensor has a first sub sensor and a second sub sensor for detecting a variation of magnetic field and outputting an electric signal, respectively, and wherein a front end of the first sub sensor and a front end of the second sub sensor are spaced in a predetermined distance in a moving direction of the piston rod, and thus an output signal of the first sub sensor and an output signal of the second sub sensor are generated with a time difference when piston rod moves.

8. The damper according to claim 1, wherein the signal processing part comprises:

a signal amplifying part for amplifying the output signal of the GMR sensor; and a digital transformation part for transforming the signal amplified in the signal amplifying part to a square wave.

9. The damper according to claim 1, wherein the housing is provided with an opening at an end thereof and the GMR sensor is mounted on an outside of a PCB substrate which closes up the opening.

10. The damper according to claim 9, wherein a protective cover is provided at an outside of the GMR sensor.

11. The damper according to claim 1, wherein the magnet is a permanent magnet which is fixed to an inside of the PCB substrate.

12. The damper according to claim 9, wherein a second PCB substrate mounted with the signal processing part and attached circuits is installed inside the housing and the PCB substrate and the second PCB substrate are electrically connected through FPCB.

* * * * *